(12) United States Patent
Park et al.

(10) Patent No.: US 9,094,731 B2
(45) Date of Patent: Jul. 28, 2015

(54) METHOD FOR PROVIDING MULTIMEDIA CONTENT LIST, AND MULTIMEDIA APPARATUS APPLYING THE SAME

(71) Applicant: Samsung Electronics Co., Ltd., Suwon-si, Gyeonggi-do (KR)

(72) Inventors: Jung-Chul Park, Incheon (KR); Ji-yeon Kwak, Seoul (KR); Min-kyu Park, Seoul (KR); Soo-yeoun Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 14/103,240

(22) Filed: Dec. 11, 2013

(65) Prior Publication Data

US 2014/0101699 A1 Apr. 10, 2014

Related U.S. Application Data

(63) Continuation of application No. 12/183,428, filed on Jul. 31, 2008, now abandoned.

(30) Foreign Application Priority Data

Jan. 11, 2008 (KR) ........................ 10-2008-0003458

(51) Int. Cl.
| | | |
|---|---|---|
| *G06F 17/30* | (2006.01) | |
| *H04N 21/482* | (2011.01) | |
| *H04N 5/445* | (2011.01) | |
| *H04N 7/16* | (2011.01) | |
| *H04N 21/431* | (2011.01) | |
| *H04N 21/81* | (2011.01) | |
| *H04N 21/8405* | (2011.01) | |
| *H04N 21/443* | (2011.01) | |

(52) U.S. Cl.
CPC ....... *H04N 21/4828* (2013.01); *H04N 5/44543* (2013.01); *H04N 7/163* (2013.01); *H04N 21/4312* (2013.01); *H04N 21/4314* (2013.01); *H04N 21/8153* (2013.01); *H04N 21/8405* (2013.01); *G06F 17/30864* (2013.01); *H04N 21/4316* (2013.01); *H04N 21/4438* (2013.01)

(58) Field of Classification Search
None
See application file for complete search history.

(56) References Cited

U.S. PATENT DOCUMENTS

| | | | |
|---|---|---|---|
| 6,005,565 | A | 12/1999 | Legall et al. |
| 6,441,836 | B1 | 8/2002 | Takasu et al. |
| 7,281,220 | B1 | 10/2007 | Rashkovshiy |
| 7,293,275 | B1 | 11/2007 | Krieger et al. |
| 7,369,843 | B2 | 5/2008 | Horiguchi |
| 7,620,629 | B2 | 11/2009 | Tanaka |

(Continued)

FOREIGN PATENT DOCUMENTS

| | | |
|---|---|---|
| JP | 2006-330997 A | 12/2006 |
| KR | 10-2007-0027143 A | 3/2007 |

*Primary Examiner* — Richard Bowen
(74) *Attorney, Agent, or Firm* — Jefferson IP Law, LLP

(57) ABSTRACT

A method of displaying a list is provided. The method includes receiving a user command to display a list of multimedia content, determining at least one multimedia content which matches a pre-stored keyword from among a plurality of multimedia content included in the list, in response to the user command, and displaying the list including the plurality of multimedia content based on the result of the determination, wherein the displayed list displays the pre-stored keyword as overlapping the least one multimedia content matching the pre-stored keyword from among the plurality of multimedia content.

20 Claims, 4 Drawing Sheets

(56) References Cited

U.S. PATENT DOCUMENTS

| | | |
|---|---|---|
| 7,933,887 B2 | 4/2011 | Tanaka |
| 8,005,826 B1 * | 8/2011 | Sahami et al. ............... 707/723 |
| 8,635,073 B2 * | 1/2014 | Chang ........................ 704/275 |
| 2004/0078816 A1 | 4/2004 | Johnson |
| 2006/0173985 A1 | 8/2006 | Moore |
| 2006/0239646 A1 * | 10/2006 | Kang ............................ 386/95 |
| 2006/0271588 A1 | 11/2006 | Tanaka |
| 2007/0005590 A1 | 1/2007 | Thrasher |
| 2007/0122108 A1 | 5/2007 | Bontempi |
| 2007/0266019 A1 | 11/2007 | Lavi |
| 2007/0276820 A1 | 11/2007 | Iqbal |
| 2008/0010607 A1 | 1/2008 | Ellis et al. |
| 2008/0016092 A1 * | 1/2008 | Saito et al. ................... 707/100 |
| 2008/0059526 A1 * | 3/2008 | Murakoshi ................. 707/104.1 |
| 2009/0089293 A1 | 4/2009 | Garritano et al. |
| 2009/0177627 A1 * | 7/2009 | Yoon et al. ........................ 707/3 |
| 2009/0235297 A1 * | 9/2009 | Ferrone ........................... 725/24 |
| 2010/0082665 A1 | 4/2010 | Tanaka |

* cited by examiner

| Keyword management | | | |
|---|---|---|---|
| Field | Keyword | Screen display | Automatic recording |
| Director | Ki-duk KIM | T | |
| Director | Stanley Kubrick | T | Yes |
| Star | Ji-hye HAN | T | |
| Star | Yo-han LIM | 👤 | |
| Star | Cheon-soo LEE | T | |
| Theme | Travel | T | |
| Theme | Tennis | T | Yes |
| Input new keyword | | | |

METHOD FOR PROVIDING MULTIMEDIA CONTENT LIST, AND MULTIMEDIA APPARATUS APPLYING THE SAME

CROSS-REFERENCE TO RELATED APPLICATION(S)

This application is a continuation application of a prior application Ser. No. 12/183,428, filed on Jul. 31, 2008, which claimed the benefit under 35 U.S.C §119 (a) of a Korean Application No. 10-2008-0003458 filed Jan. 11, 2008 in the Korean Intellectual Property Office, the entire disclosure of which is hereby incorporated by reference.

BACKGROUND OF THE INVENTION

1. Field of the Invention

Aspects of the present invention relate to a method of providing a multimedia content list and a multimedia apparatus applying the method, and more particularly, to a method of providing a multimedia content list including a broadcast program list, and a multimedia apparatus applying the method.

2. Description of the Related Art

Broadcast program information is conventionally provided using newspapers, televisions, and/or magazines). However, digital multi-channel broadcasting is provided via scores of channels, giving viewers a choice between a plethora of programs. As a result, the task of selecting programs has become much more complicated. Thus, digital multi-channel broadcasting provides, as a data service, an electronic program guide (EPG) that provides program tables and/or information regarding each program.

Technological development has enabled users to access a wide range of broadcasts through various channels. Additionally, as a result of the popularization of Internet communications, televisions have come to be able to access Internet networks. Accordingly, users can play back and view video on televisions using the Internet.

However, since a variety of multimedia content is played back using a television, it may be difficult for a user to distinguish between types of provided content. Additionally, a user must search for each desired program separately, resulting in an inconvenience. Furthermore, in order for a user to search for, for example, a drama in which his or her favorite actor appears or a movie of his or her favorite genre, the user must check detailed information regarding each program individually using EPGs.

Therefore, there is a need for a method by which the user may use TV multimedia content more conveniently.

SUMMARY OF THE INVENTION

Several aspects and example embodiments of the present invention relate to a method for providing a multimedia content list in which content associated with keywords is distinguished from other content, so that a user can use TV multimedia content more conveniently, and to a multimedia apparatus applying the same.

Additional aspects and/or advantages of the invention will be set forth in part in the description which follows and, in part, will be obvious from the description, or may be learned by practice of the invention.

In accordance with an example embodiment of the present invention, there is provided a method of providing a multimedia content list corresponding to multimedia content that is viewable by a user, the method including: generating a multimedia content list including the multimedia content; receiving a keyword input by the user and related to the multimedia content; and displaying, on the multimedia content list, a first content item associated with the keyword and a second content item that is not associated with the received keyword, the first content item distinguishing from the second content item on the multimedia content list as a result of the received keyword.

According to an aspect of the present invention, the displaying of the first content item and the second content item may include displaying an icon related to the keyword on the multimedia content list so that the first content item is distinguished from the second content item.

According to an aspect of the present invention, the displaying of the first content item and the second content item may include displaying the icon related to the keyword so that the icon is connected to an area of the list in which the first content item is displayed.

According to an aspect of the present invention, the displaying of the first content item and the second content item may include displaying the icon related to the keyword so that the icon comes contacts an area of the list in which the first content item is displayed.

According to an aspect of the present invention, the icon related to the keyword may include a keyword icon in text form.

According to an aspect of the present invention, the icon related to the keyword may include a photographic icon in photographic form.

According to an aspect of the present invention, the type of icon related to the keywords may be selected by the user.

According to an aspect of the present invention, the displaying of the first content item and the second content item may include displaying an area of the list in which the first content item is displayed in a different form from an area of the list in which the second content item is displayed.

According to an aspect of the present invention, the multimedia content list may be an electronic program guide (EPG).

In accordance with another example embodiment of the present invention, there is provided a multimedia apparatus to display multimedia content, the multimedia apparatus including: an input unit to receive a keyword input by a user and related to the multimedia content; and a controller to generate a multimedia content list and to control the generated list to be displayed such that a first content item associated with the keyword is distinguished from a second content item that is not associated with the keyword.

According to an aspect of the present invention, the controller may display an icon related to the keyword on the multimedia content list.

According to an aspect of the present invention, the controller may display the icon related to the keyword so that the icon is connected to an area of the list in which the first content item is displayed.

According to an aspect of the present invention, the controller may display the icon related to the keyword so that the icon contacts an area of the list in which the first content item is displayed.

According to an aspect of the present invention, the icon related to the keyword may include a keyword icon in text form.

According to an aspect of the present invention, the icon related to the keyword may include a photographic icon in photographic form.

According to an aspect of the present invention, the type of the icon related to the keyword may be selected by the user.

According to an aspect of the present invention, the controller may display an area of the list in which the first content item is displayed in a different form from an area of the list in which the second content item is displayed.

According to an aspect of the present invention, the multimedia content list may be an electronic program guide (EPG).

In accordance with yet another example embodiment of the present invention, there is provided a method of displaying a multimedia content list corresponding to multimedia content that is viewable by a user, the method including: receiving a keyword input by the user and related to the multimedia content; and displaying, on the multimedia content list, a first content item of the multimedia content associated with the received keyword and a second content item of the multimedia content that is not associated with the received keyword, the first content item distinguishing from the second content item on the multimedia content list as a result of the received keyword.

In addition to the example embodiments and aspects as described above, further aspects and embodiments will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

DETAILED DESCRIPTION OF THE EMBODIMENTS

Figure 1:
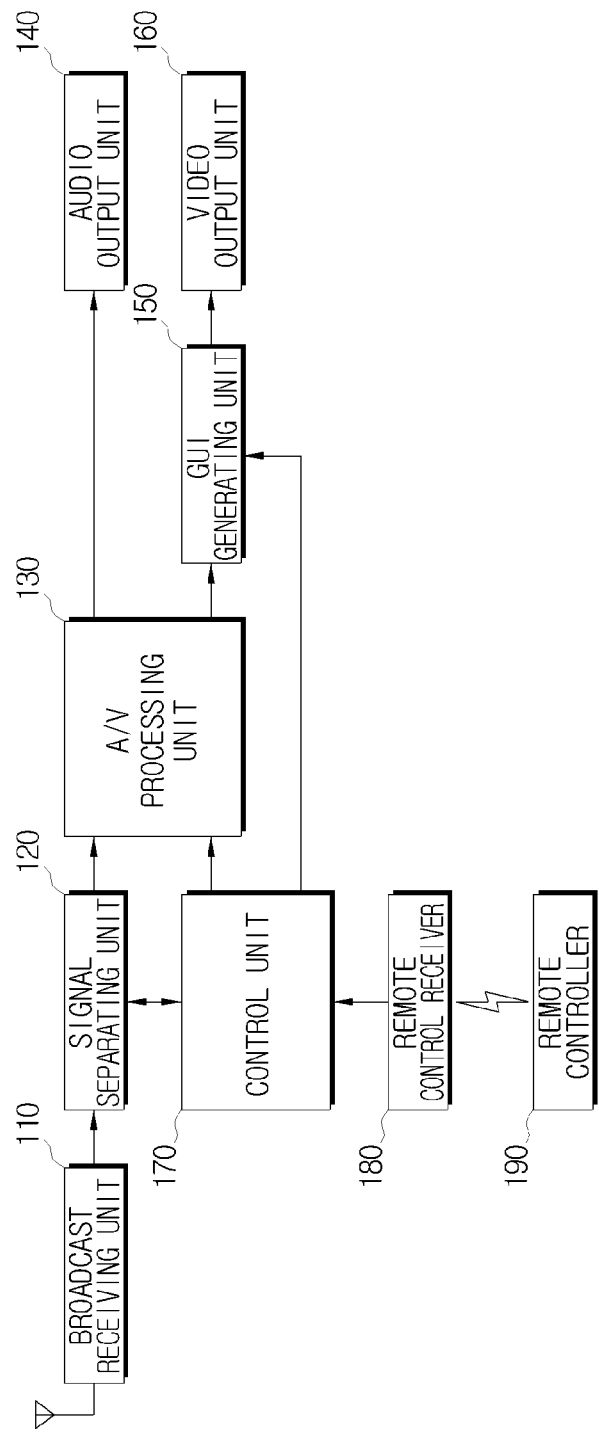
FIG. 1 is a block diagram of a digital television (DTV) according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a digital television (DTV) according to an example embodiment of the present invention. Referring to FIG. 1, the DTV includes a broadcast receiving unit 110, a signal separating unit 120, an audio/video (AN) processing unit 130, an audio output unit 140, a graphical user interface (GUI) generating unit 150, a video output unit 160, a control unit 170, a remote control receiver 180, and a remote controller 190.

The broadcast receiving unit 110 receives a broadcast from a broadcast station or a satellite via a cable and/or wirelessly, and demodulates the received broadcast. The signal separating unit 120 separates the demodulated broadcast signal output from the broadcast receiving unit 110 into a video signal, an audio signal, and electronic program guide (EPG) information. The signal separating unit 120 transmits the video signal and the audio signal to the AN processing unit 130, and the EPG information to the GUI generating unit 150.

The A/V processing unit 130 performs signal processing (such as video decoding, video scaling, audio decoding, etc.) on the video signal and the audio signal output from the signal separating unit 120. Additionally, the A/V processing unit 130 transmits the processed video signal and the processed audio signal to the video output unit 160 and the audio output unit 140, respectively. The audio output unit 140, in turn, may output the audio signal transmitted from the A/V processing unit 130 through a speaker of the DTV, or may output the audio signal to an external device (for example, an external speaker) that is connected through an external output terminal.

The GUI generating unit 150 generates a GUI to be provided to a user, and displays the generated GUI (for example, superimposed over video output from the A/V processing unit 130). For example, the GUI generating unit 150 may generate a GUI for displaying a multimedia content list using the received EPG information. The multimedia content list corresponds to multimedia content that is viewable by a user (i.e., viewable by the user in the present or in the future). The video output unit 160 may display the video output from the A/V processing unit 130 on a display unit of the DTV, or may output the video to an external device (for example, an external display) that is connected through an external output terminal.

The remote controller 190 receives user operating commands and transmits the received commands to the DTV via the remote control receiver 180. The user may input desired keywords and/or may select content on the EPG using the remote controller 190.

The control unit 170 recognizes the user operating commands transmitted from the remote controller 190, and controls the entire operation of the DTV in response to the user operating commands. Specifically, the control unit 170 generates a broadcast content list using the EPG information received from the broadcast station and searches for content associated with one or more keywords input by the user using the input keywords.

The broadcast content list includes information on the broadcast content (such as the title, time, producer, star, and/or outline of the broadcast content transmitted from the broadcast station, and/or the location at which the broadcast content was filmed). Such information regarding the broadcast content is contained in the EPG information transmitted from the broadcast station.

Additionally, the control unit 170 controls the GUI generating unit 150 to generate a GUI representing a broadcast content list in which content associated with one or more keywords is distinguished from other content. The control unit 170 displays icons related to the one or more keywords on the broadcast content list, and causes the content associated with the one or more keywords to be distinguished from other content. The control unit 170 displays the icons related to the one or more keywords so that the icons may be connected to areas in which content associated with the one or more keywords is located (hereinafter, referred to as keyword content areas). For example, the control unit 170 may display the icons and the content so that the keyword content areas are connected to the icons with lines or so that the icons are in contact with the keyword content areas in order to indicate that the content is associated with the one or more keywords. In other words, the control unit 170 displays the icons such that the icons are linked to the keyword content areas, so that it is possible to provide the user with an easy way to search for content associated with the one or more keywords.

Additionally, the control unit 170 may display the keyword content areas differently from other areas on which content other than the content associated with the one or more keywords is displayed, so that the content associated with the one or more keywords is distinguished from other content. For example, the areas may differ in colors and/or font styles (such as a font type, a font size, a font color, etc.).

Figure 2:
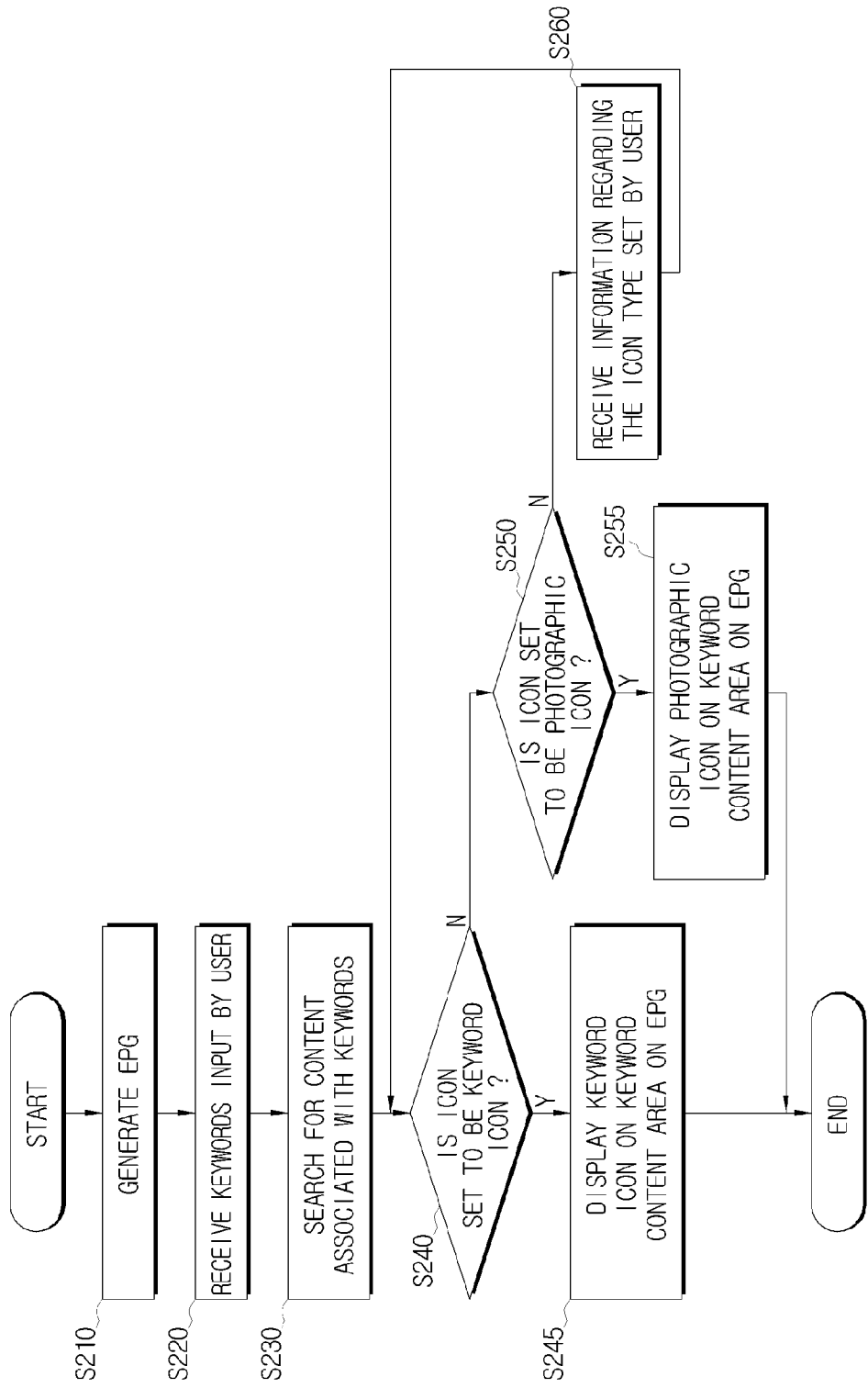
FIG. 2 is a flowchart explaining a process for providing an electronic program guide (EPG) in which icons are displayed representing content associated with keywords, according to an example embodiment of the present invention.

Hereinafter, a process by which the control unit 170 provides the broadcast content list will be described in detail with reference to FIGS. 2 to 5. FIG. 2 is a flowchart explaining a process for providing an EPG in which icons are displayed representing content associated with keywords, according to an example embodiment of the present invention.

Referring to FIG. 2, the control unit 170 generates a broadcast content list based on the EPG information in operation S210. The control unit 170 receives one or more keywords input by the user using the remote controller 190 in operation S220. The user inputs the one or more keywords in order to search for desired programs. For example, the user may input the name of his or her favorite actor and/or his or her favorite genre as keywords. The user may manually input the one or more keywords using character input keys on the remote controller 190, and/or may select the one or more keywords from a window on which information about a currently broadcast program is displayed. If the user manually inputs keywords using the character input keys on the remote controller 190, the control unit 170 provides a character input window.

An example process by which the user manually inputs keywords will now be described. The user selects keyword fields, such as director, star or theme. The user inputs keywords, such as the name of his or her favorite actor or sport. Subsequently, the user determines what form icons indicating the input keywords are to be displayed. The input keywords may be indicated either by a keyword icon in text form, or by a photographic icon in photographic form representing photographs associated with the keywords. The user determines whether to perform an automatic recording function. The user manages the input keywords using a keyword management screen (such as is shown in FIG. 4), which will be described in detail later.

Figures 3, 4:
FIG. 3 illustrates a keyword registration screen, according to an example embodiment of the present invention.
FIG. 4 illustrates a keyword management screen, according to an example embodiment of the present invention.

Alternatively, if the user selects keywords from a window showing information about the currently broadcast program, a keyword registration screen may be used, as illustrated in FIG. 3.

FIG. 3 illustrates the keyword registration screen, according to an example embodiment of the present invention. Referring to FIG. 3, the keyword registration screen includes a content display window 310 and a content information window 320.

The content display window 310 displays currently viewed broadcast content. The content information window 320 shows information regarding the currently viewed broadcast content. Accordingly, the user may check the information regarding the currently viewed broadcast content (such as information on the title, star, producer, and/or filming location of the currently viewed broadcast content) using the content information window 320. Additionally, the user may select the information displayed on the content information window 320 to register the selected information as keywords.

For example, the content information window 320 of FIG. 3 shows information regarding persons appearing in the currently viewed broadcast content. If the user selects "Ji-hye HAN" 330 from the content information window 320, the control unit 170 registers "Ji-hye HAN" 330 as a keyword. The user can thereby register keywords using the content information window 320. Additionally, since the registered keywords are stored in a storage device of the TV, there is no need to further input keywords that have already been registered.

Referring back to FIG. 2, the control unit 170 searches for content associated with the one or more keywords using the EPG information in operation S230. Furthermore, the control unit 170 may generate an additional list including the content associated with the one or more keywords found as a result of the search (operation S230).

Additionally, the control unit 170 may separately provide the keyword management screen with which the user may check the registered keywords. The keyword management screen will now be described in detail with reference to FIG. 4.

FIG. 4 illustrates a keyword management screen, according to an example embodiment of the present invention. In FIG. 4, the one or more keywords input by the user are arranged and displayed according to fields in the keyword management screen.

"Field" on the keyword management screen indicates categories to which keywords belong. For example, in FIG. 4, the keywords are classified into "director," "star," and "theme" on the keyword management screen. "Keyword" on the keyword management screen indicates keywords registered by the user. "Screen display" on the keyword management screen represents forms of icons displayed together with corresponding content associated with the keywords. For example, "T" shown on "Screen display" indicates that a keyword icon is displayed together with content associated with the corresponding keyword, and a photograph shown on "Screen display" indicates that a photographic icon is displayed together with content associated with the corresponding keyword. The type of icons (such as text icons or photographic icons" may be selected by the user.

"Automatic recording" on the keyword management screen indicates whether the user desires to perform automatic recording of broadcast content associated with the corresponding keyword. The control unit 170 automatically records broadcast content for which "Yes" is indicated at the corresponding broadcast time. For example, referring to FIG. 4, the control unit 170 automatically records broadcast content items corresponding to the keywords "Stanley Kubrick" and "Tennis." Additionally, the user may select "Input new keyword" to input new keywords. As described above, the user may check which keywords he has inputted, using the keyword management screen.

Referring back to FIG. 2, the control unit 170 determines whether an icon indicating the one or more keywords is set to be a keyword icon in operation S240. If it is determined that the icon is set to be a keyword icon (operation S240-Y), the control unit 170 displays the keyword icon on the keyword content area on the EPG in operation S245. As an example, the control unit 170 displays the keyword icon to contact the keyword content area so that the user can more conveniently know that the corresponding content is associated with the keyword.

If the icon is set to be a photographic icon in operation S250-Y, the control unit 170 displays the photographic icon on the keyword content area of the EPG in operation S255. The photographic icon displays an image related to the keyword, and may be selected by the user or may be captured from a scene of the broadcast content.

Alternatively, if the icon type is not set to be a photographic icon in operation S250-N, the control unit 170 receives information regarding the icon type set by the user in operation S260. For example, the control unit 170 displays a screen (such as the keyword management screen of FIG. 4) to enable the user to input the icon type.

Figure 5:
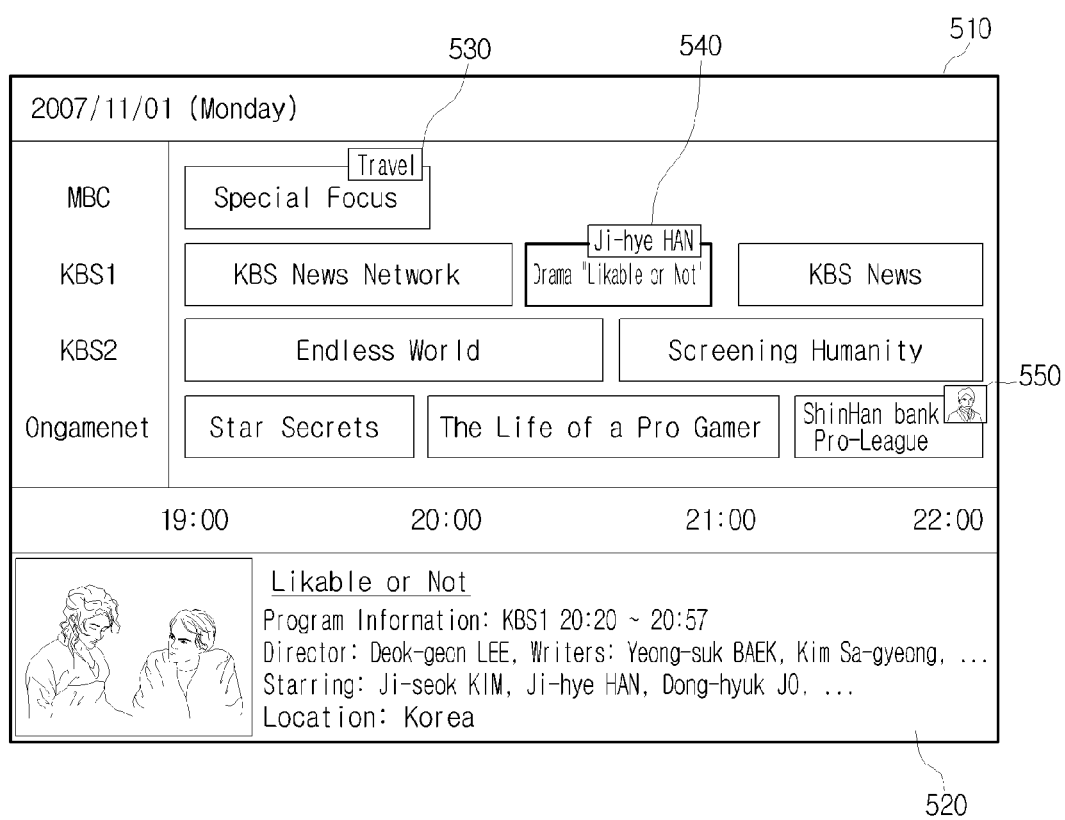
FIG. 5 illustrates an EPG screen in which icons are displayed representing content associated with keywords, according to an example embodiment of the present invention.

Hereinafter, the process described above will be described in detail with reference to an EPG screen shown in FIG. 5. FIG. 5 illustrates an EPG screen in which icons are displayed representing content associated with keywords, according to an example embodiment of the present invention.

Referring to FIG. 5, the EPG screen includes a broadcast content list 510 and a detailed information window 520 to display detailed information regarding broadcast content. If the user selects broadcast content using the remote controller 190, the control unit 170 displays detailed information regarding the selected broadcast content on the detailed information window 520 on a lower portion of the EPG screen. It is understood that aspects of the present invention are not limited to the detailed information window 520 being located on the lower portion of the EPG screen. For example, the detailed information window may be located on an upper portion of the EPG screen, or elsewhere. The detailed information window 520 displays information regarding the program, producer, star, and filming location, based on EPG information.

The broadcast content list 510 is displayed according to channels and/or time slots. A vertical axis of the EPG screen shown in FIG. 5 indicates each channel, and a horizontal axis thereof indicates each time slot. As an example, referring to the broadcast content list 510, broadcast content entitled "Likable or Not" is broadcast from 20:20 to 20:57 pm.

Keyword icons or photographic icons are displayed above some content items on the broadcast content list 510. For example, a keyword icon, "Travel," 530 is displayed above content entitled, "Special Focus." Referring to FIG. 4, the keyword "Travel" belongs to a field "Theme." Accordingly, the broadcast content "Special Focus" is a program regarding travel. Additionally, a keyword icon "Ji-hye HAN" 540 is displayed above the content entitled "Likable or Not" on the EPG screen of FIG. 5. Referring to FIG. 4, the keyword "Ji-hye HAN" belongs to a field "Star," and the actress "Ji-hye HAN" appears in a program entitled, "Likable or Not." Furthermore, a photographic icon 550 is displayed above content entitled "ShinHan Bank Pro-League" on the EPG screen of FIG. 5. Referring to FIG. 4, the photographic icon 550 corresponds to a keyword "Yo-han LIM" belonging to a field "Star." Accordingly, it is possible to know that Yo-han LIM appears on a program entitled, "ShinHan Bank Pro-League." As described above, the icons are displayed above or near the corresponding content associated with the corresponding keywords on a screen showing the broadcast content list 510, so the user can easily check which content is related to the registered keywords.

The control unit 170 may display a keyword content area indicating content associated with keywords differently from other areas showing content other than the content associated with keywords. The differently displayed areas may be distinguished by colors and/or fonts.

For example, the background color of the content entitled "Likable or Not," "Special Focus," and "ShinHan Bank Pro-League" of FIG. 5 may be displayed in red, while other content is displayed without the background color. Accordingly, the broadcast content list 510 may be displayed so that the content associated with the keywords is distinguished from other content.

While a photographic icon is used to represent keywords, it is understood that aspects of the present invention are also applicable to various types of images related to the keywords. For example, keywords may be represented by thumbnail icons or character icons.

In the example embodiment of the present invention described above, the broadcast content list generated using the EPG information is displayed together with icons. However, it is understood that aspects of the present invention are equally applicable to a multimedia content list (for example, a video-on-demand (VOD) service content list of an Internet protocol (IP) TV or an Internet moving image file list).

Additionally, while the DTV is applied as a multimedia apparatus according to the exemplary embodiment of the present invention described above, there is no limitation to the type of multimedia apparatus to which aspects of the present invention are applicable. For example, aspects of the present invention are equally applicable to a portable TV, a personal multimedia player (PMP), and a moving picture experts group-1 audio layer 3 (MP3) player.

As described above, according to aspects of the present invention, a multimedia content list is provided in which content associated with keywords is distinguished from other content, so the user is able to use TV multimedia content more conveniently. Additionally, icons indicating keywords are displayed relative to the content associated with the keywords on an EPG screen, so the user can more easily check a program related to the keywords he has registered.

Aspects of the present invention can also be embodied as computer-readable codes on a computer-readable recording medium. Also, codes and code segments to accomplish the present invention can be easily construed by programmers skilled in the art to which the present invention pertains. The computer-readable recording medium is any data storage device that can store data which can be thereafter read by a computer system or computer code processing apparatus. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, an already-generated broadcast content list may be modified and displayed according to aspects of the present invention (i.e., without generating a new broadcast content list). Furthermore, multiple keywords may be applied to one icon. Accordingly, it is intended, therefore, that the present invention not be limited to the various example embodiments disclosed, but that the present invention includes all embodiments falling within the scope of the appended claims.

What is claimed is:

1. A method of displaying a list of a display apparatus, the method comprising:
   receiving a user command to display a list of multimedia content;
   determining at least one multimedia content which matches a pre-stored keyword from among a plurality of multimedia content included in the list, in response to the user command; and
   displaying the list including the plurality of multimedia content based on the result of the determination,
   wherein the displayed list displays the pre-stored keyword as overlapping the least one multimedia content matching the pre-stored keyword from among the plurality of multimedia content, and
   wherein the display apparatus displays a list of information related to a broadcast content which is currently displayed and stores information selected from the list as the pre-stored keyword.

2. The method of claim 1, wherein the pre-stored keyword is displayed as one of a text icon and a photographic icon.

3. The method of claim 1, wherein a type of the displayed icon is determined according to a user input.

4. The method of claim 1, wherein at least one of the plurality of multimedia content in the displayed list does not match the pre-stored keyword.

5. The method of claim 4, wherein the displaying of the list comprises:
   displaying the at least one multimedia content that matches the pre-stored keyword in a first area of the multimedia content list; and
   displaying the at least one multimedia that does not match the pre-stored keyword in a second area of the multimedia content list.

6. The method of claim 5, wherein at least one of a background color and font style of the first area is different from a corresponding background color and font style of the second area.

7. The method of claim 1, wherein the multimedia content list is an Electronic Program Guide (EPG).

8. The method of claim 1, wherein the multimedia content list is a video on demand content list.

9. The method of claim 1, wherein the multimedia content list is a list of multimedia content available via an internet.

10. The method of claim 1, further comprising:
    automatically recording the at least one multimedia content that matches the pre-stored keyword.

11. The method of claim 1, wherein the pre-stored keyword is selected according to user input.

12. A multimedia apparatus comprising:
    an input unit configured to receive a user command to display a list of multimedia content;
    a display unit configured to display the list of multimedia content in response to the user command;
    a storage unit configured to store a pre-stored keyword; and
    a controller configured to determine at least one multimedia content matching the pre-stored keyword, and to control the display unit to display the pre-stored keyword as overlapping the at least one content matching the pre-stored keyword from among the plurality of multimedia content,
    wherein the controller controls the display to display a list of information related to a broadcast content which is currently displayed and stores information selected from the list as the pre-stored keyword.

13. The multimedia apparatus of claim 12, wherein the pre-stored keyword is displayed as one of a text icon and a photographic icon.

14. The multimedia apparatus of claim 13, wherein the input unit receives a user input indicating a type of the displayed icon.

15. The multimedia apparatus of claim 12, wherein at least one of the plurality of multimedia content in the displayed list does not match the pre-stored keyword.

16. The multimedia apparatus of claim 15, wherein the display unit displays the at least one multimedia content that matches the pre-stored keyword in a first area of the multimedia content list, and
    wherein the display unit displays the at least one multimedia that does not match the pre-stored keyword in a second area of the multimedia content list.

17. The multimedia apparatus of claim 16, wherein at least one of a background color and font style of the first area is different from a corresponding background color and font style of the second area.

18. The multimedia apparatus of claim 12, wherein the multimedia content list is one of an Electronic Program Guide (EPG), a video on demand content list, and a list of multimedia content available via an internet.

19. The multimedia apparatus of claim 12, wherein the controller automatically records the at least one multimedia content that matches the pre-stored keyword and stores the recorded multimedia content in the storage unit.

20. The multimedia apparatus of claim 12, wherein the input unit receives user input to select the pre-stored keyword.

* * * * *